Figure 1:
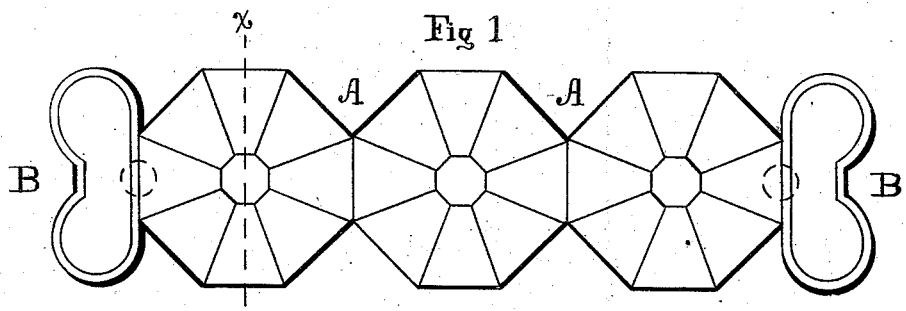

J. H. PETERSON.
ORNAMENTAL STAIR-ROD.

No. 187,555. Patented Feb. 20, 1877.

Witnesses:
Lewis F. Broust
John A. Wiedersheim

Inventor:
John H. Peterson

UNITED STATES PATENT OFFICE.

JOHN H. PETERSON, OF PHILADELPHIA, PENNSYLVANIA, ASSIGNOR OF ONE-HALF HIS RIGHT TO JOHN R. TOBIN, OF SAME PLACE.

IMPROVEMENT IN ORNAMENTAL STAIR-RODS.

Specification forming part of Letters Patent No. 187,555, dated February 20, 1877; application filed August 18, 1876.

*To all whom it may concern:*

Be it known that I, JOHN H. PETERSON, of the city of Philadelphia, in the county of Philadelphia and State of Pennsylvania, have invented a new and useful Improvement in Ornamental Stair-Rods, which improvement is fully set forth in the following specification, reference being had to the accompanying drawings.

The object of my invention is to form a showy and highly-ornamental stair-rod; and it consists in covering a suitable rod or tube with pieces of glass, or other suitable material, for ornamentation of various sizes and shapes, as shown in the drawings, and hereinafter more fully described.

Said coverings may be made of any desired size or shape, and in various colors, or they may be transparent, thus showing the rods, which may be figured or corrugated, thus presenting a very showy and handsome appearance through the glass; or the ornamental pieces may be made of opaque material, thus hiding the rod entirely from view.

Figure 2:
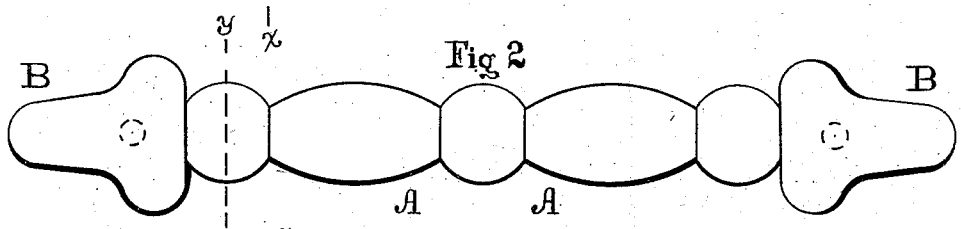
Figure 3:
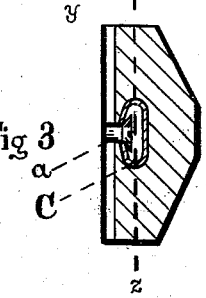
Figure 4:
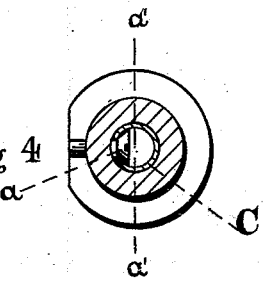
Figure 5:
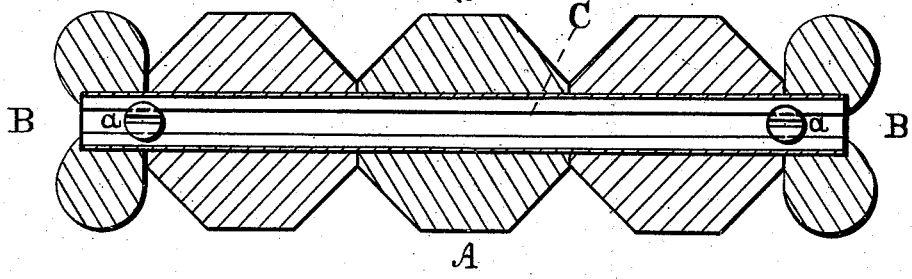
Figure 6:
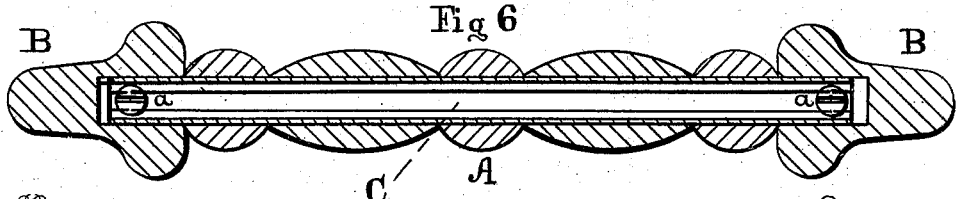

Figures 1 and 2 are face views of the ornamental rods when in position, showing two styles of the same. Fig. 3 is a transverse section in line $x\ x$ of Fig. 1. Fig. 4 is a transverse section in line $y\ y$ of Fig. 2. Fig. 5 is a longitudinal section in line $z\ z$ of Fig. 3. Fig. 6 is a similar longitudinal section in line $a'\ a'$ of Fig. 4.

B B are the suitably-shaped caps or ends, being made thicker than the others, thereby pressing closely between the rod and the stairs, and holding the whole stair-rod firm and tight to the stairway. C is a suitable rod or tube, upon which the ornamental pieces are strung. $a\ a$ are the screws or pins which hold the rod or tube to the stairs, the whole forming a very beautiful stair-rod, and one that will require little cleaning.

Having thus fully described my invention, what I claim as new, and desire to secure by Letters Patent, is—

An improved ornamental stair-rod, consisting of the rod C, having strung upon it the pieces A, made of glass or other suitable material, for ornamentation, together with thickened and suitably-shaped cap or end pieces B, of like material, all substantially as herein shown and described, for the purpose specified.

JOHN H. PETERSON.

Witnesses:
 EDWD. H. SOUDER,
 GEORGE SLOOK.